United States Patent [19]
Kubo et al.

[11] 3,738,199
[45] June 12, 1973

[54] SHIFT CONTROL SYSTEM FOR AUTOMATIC TRANSMISSIONS

[75] Inventors: Seitoku Kubo; Takakazu Mori; Teruo Akashi; Chihiro Hayashi, all of Toyota, Japan

[73] Assignee: Toyota Jidasha Kogyo Kabushiki Kaisha, Toyota-shi, Japan

[22] Filed: May 26, 1971

[21] Appl. No.: 147,054

[30] Foreign Application Priority Data
May 29, 1970  Japan............................... 45/46519

[52] U.S. Cl. ................................................. 74/869
[51] Int. Cl. ............................................ B60k 21/00
[58] Field of Search...................... 74/869, 860, 866

[56] References Cited
UNITED STATES PATENTS

| | | | |
|---|---|---|---|
| 3,561,296 | 2/1971 | Iijima................................... | 74/869 |
| 3,646,835 | 3/1972 | Ito........................................ | 74/869 |
| 3,651,714 | 3/1972 | Ohya.................................... | 74/869 |
| 3,656,373 | 4/1972 | Tetsuo.................................. | 74/869 |

*Primary Examiner*—C. J. Husar
*Attorney*—Cushman, Darby & Cushman

[57] ABSTRACT

In an automatic transmission including a speed change gear and friction engagement means with hydraulic servo units for accomplishing gear shifting engagements of the speed change gear, a shift control system for automatic transmission comprising shift valves for changing the oil passages to supply or exhaust oil pressures to the hydraulic servo units, shift point computing circuits for generating shift signals to control the oil passage changing operations of the shift valves, and means for controlling the shift signals produced by the shift point computing circuit in terms of time.

9 Claims, 12 Drawing Figures

000
SHIFT CONTROL SYSTEM FOR AUTOMATIC TRANSMISSIONS

BACKGROUND OF THE INVENTION

1. Field of the Invention

The present invention relates generally to transmission systems and more particularly to a shift control system which combines electrical and hydraulic controls.

2. DESCRIPTION OF THE PRIOR ART

A suitable oil pressure must be supplied to the engaging means (hydraulic servos) of a transmission that suits the transmission input torque, in consideration of the engine output and the torque multiplication action of a torque converter, the gear positions (engaging means) of the transmission and so on, and the oil supply under excessive pressure tends to result in an increased shock in the transmission when the gear position is changed from one to another and in an increased power loss of the engine driving the pump which supplies the hydraulic pressures.

SUMMARY OF THE INVENTION

In order to meet the above-mentioned requirements and simultaneously accomplish the required line pressure control through a simple system combining both electrical and hydraulic controls, the present invention contemplates to control a pressure regulator valve for providing the line pressure by means of shift valves which receive electrical signals to perform gear changing operations.

Therefore, principal principle object of the present invention is to provide an arrangement wherein when a transmission is shifted from the neutral position, shift valves are held for a predetermined time in such positions that a pressure regulator valve provides the line pressure at a low value to thereby relieve the shock due to the transmission changing from neutral to a driving position.

Another object of the present invention is to provide an arrangement wherein when a transmission changes from neutral to a driving position, shift valves are held in their high speed gear positions for a predetermined time so that a hydraulic servo for engaging the high speed gear is utilized as an accumulator for a drive coupling clutch to relieve the shock due to the transmission changing from neutral to the driving position.

To achieve these objects, the present invention consists primarily of a shift control system for automatic transmissions of the type which includes a speed change gear and friction engagement means with hydraulic servo units for effecting the gear shifting engagements of the speed change gear, the shift control system comprising shift valves for changing the oil passages to direct or exhaust the oil pressure supply to the hydraulic servos, shift point computing circuits for generating shift signals to control the oil passage changing operations of the shift valves, and means for controlling the shift signals from the shift point computing circuits in terms of time.

DESCRIPTION OF THE PREFERRED EMBODIMENTS

Figure 1:
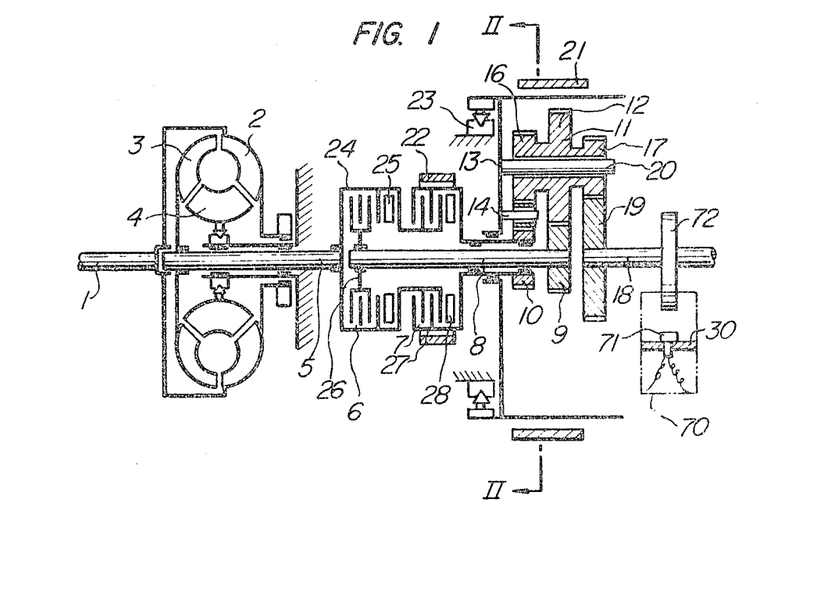
FIG. 1 is a schematic view showing by way of example the principle of a transmission incorporating the shift control system of the present invention.
Figure 2:
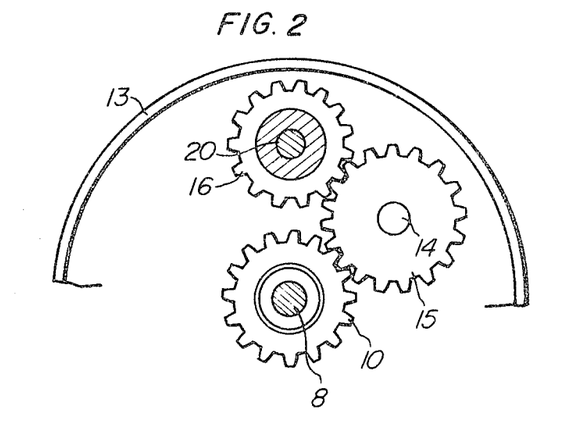
FIG. 2 is a partial sectional view taken along the line II—II of FIG. 1, showing in detail the relationships between an idler gear not shown in FIG. 1 and the associated gears.
Figure 3:
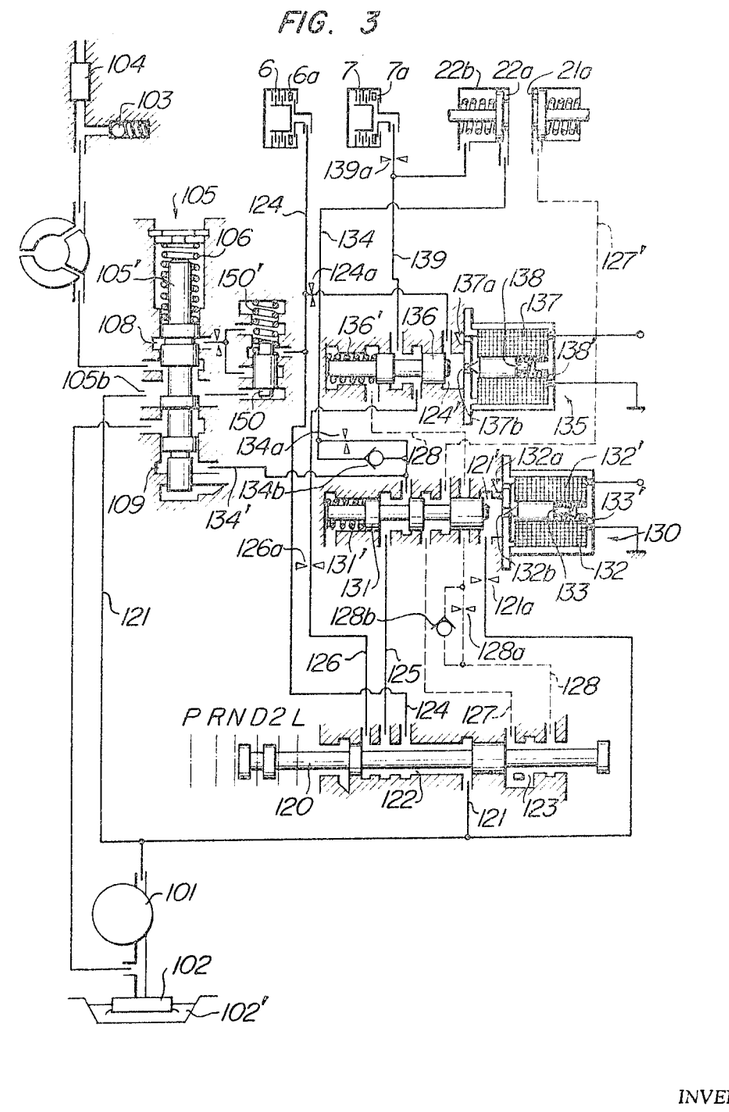
FIG. 3 is a schematic diagram of a hydraulic control circuit constituting a control section of the transmission.
Figure 4:
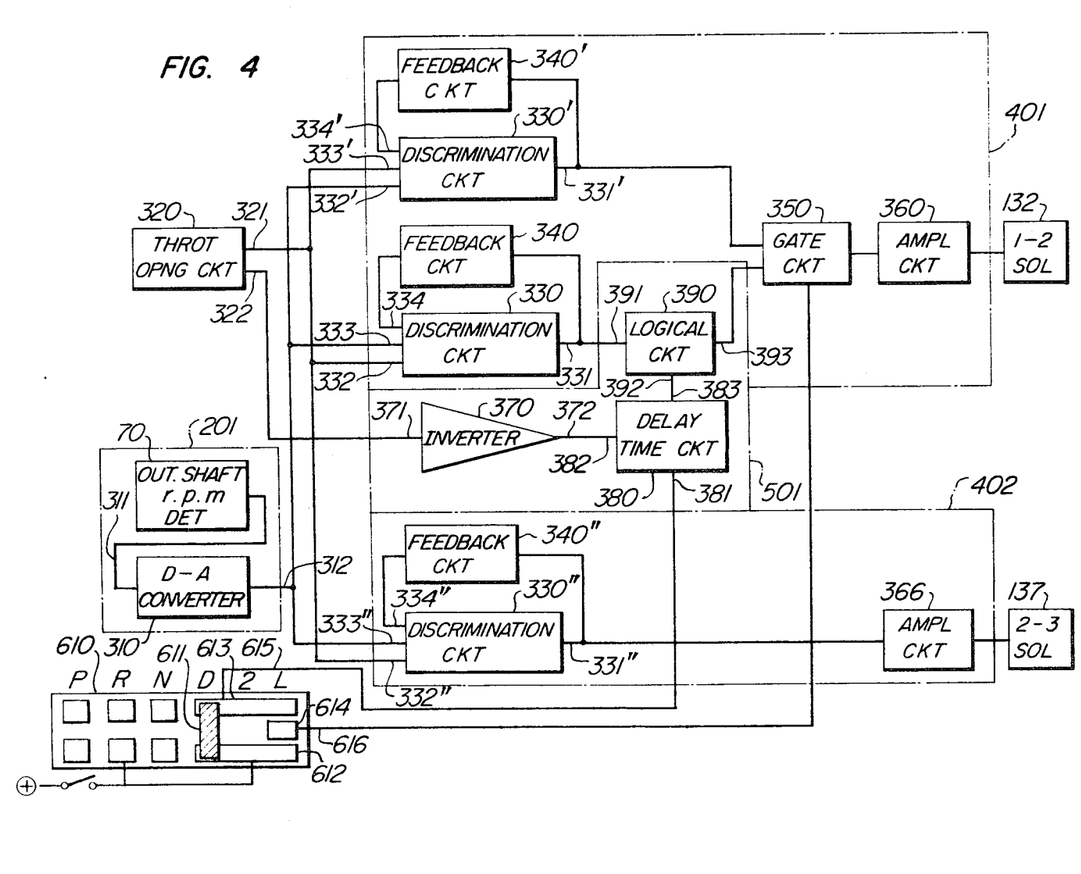
FIG. 4 is a block diagram showing the construction of an electrical control circuit constituting a control section of the transmission.

FIGS. 1 and 2 illustrate a transmission controlled by the control system of the present invention. The control system comprises a hydraulic control section (FIG. 3) and an electrical control section (FIG. 4).

As shown in FIGS. 1 and 2, the transmission comprises a torque converter and a planetary gear system providing three forward speeds and one reverse speed. The torque converter is of the conventional type comprising a pump turbine 2, a turbine wheel 3 and a stator 4, and the pump turbine 2 is directly connected to an engine crankshaft 1 and the turbine wheel 3 is connected to a turbine shaft 5 to transmit the torque to the planetary gear system. The planetary gear system comprises two multiple disk clutches and two hydraulic brake band units which are engaged by means of hydraulic servo motors, a one-way clutch using sprags, and a planetary gear train consisting of sun gears and pinion gears. The turbine shaft 5 is connected by way of a front clutch 6 to an intermediate shaft 8 having an input sun gear 9 and the shaft 5 is also connected to a reverse sun gear 10 by way of a rear clutch 7. A brake band unit 22 (hereinafter referred to as a front brake band) is mounted around the rear clutch 7 to lock the reverse sun gear 10 and the band 22 is applied by a hydraulic servo. The input sun gear 9 is meshed with a gear 12 of pinions 11 consisting of a suitable number of pinions (e.g. two or three) arranged around the input sun gear 9. The reverse sun gear 10 is meshed with an idler gear 15 carried by a carrier 13 and a gear 16 of the pinions 11 is meshed with the idler gear 15. The rearmost gear 17 of the pinions 11 is meshed with a gear 19 of an output shaft 18 of the transmission. The pinions 11 and the idler gear 15 are mounted on the carrier 13 by pinion pins 20 and 14, respectively, and the carrier 13 is provided with a brake band unit 21 (hereinafter referred to as a rear brake band) to lock the carrier 13 and the band 21 is applied by a hydraulic servo. The carrier 13 is also provided with a one-way clutch 23 which holds the former against rotation in one direction.

With the arrangement described above, the operation of the transmission will be explained hereunder.

In the first speed, the front clutch 6 and the rear brake band 21 are applied (However, when the drive is provided from the engine side, the one-way clutch 23 is also actuated so that it is not always necessary to apply the rear brake band, although in this case no driving force is transmitted from the output shaft 18). The rotation of the turbine shaft 5 is carried to the input sun gear 9 so that since the carrier 13 is now locked by the rear brake band 21, the pinion pin 20 is also locked to transmit the input rotation to the gear 19 on the output shaft at a reduced speed from the gear 9 and the gear 12 and through the gear 17.

In the second speed, the front clutch 6 and the front brake band 22 are applied. The input is now carried from the input sun gear 9 and the reverse sun gear 10 is held stationary since the clutch drum 27 is locked by the front brake band 22. The rotation of the input sun gear 9 causes the carrier 13 to rotate in the same direction as the input sun gear 9 by the reaction force of the reverse sun gear 10 so that the rotation is transmitted to the gear 19 on the output shaft 18 at a reduced speed.

The third speed is obtained by engaging both of the front clutch 6 and the rear clutch 7. The input is now applied by way of the input sun gear 9 and the reverse sun gear 10, so that the whole planetary gear system rotates as a unit to rotate the turbine 5 and the output shaft 18 at a drive ratio of 1:1.

The reverse is obtained when the rear clutch 7 and the rear brake band 21 are applied. The carrier 13, hence the pinion pins 14 and 20 are locked, so that the input from the turbine shaft 5 is transmitted to the gear 19 on the output shaft 18 through the reverse sun gear 10, the idler gear 15 and through the gears 16 and 17 of the pinions 11, thereby reversing the rotation of the output shaft 18.

Next, the hydraulic control section of the control system will be explained.

The required oil pressures to the hydraulic circuits are supplied from a pump 101 comprising gears or vanes, for example. The pump 101 is driven by a shaft directly connected to the engine and it delivers a suitable oil pressure to the oil passage 121 from an oil reservoir 102' through an oil screen 102. The oil passage 121 is connected to a pressure regulator valve 105 and a manual valve 120. The pressure regulator valve 105 is of the type which is commonly employed as a regulator valve for automobile automatic transmissions, and it comprises a spring 106 and a valve spool 105' and the oil pressures admitted into chambers 108 and 109 having differential valve lands are balanced against the spring pressure to accomplish the necessary pressure regulation. The oil pressure controlled by the pressure regulator valve 105 is referred to as a line pressure. The hydraulic pressure directed to chamber 108 is controlled by the manual valve 120 and a relay valve 150, while the oil pressure directed to chamber 109 is controlled by the manual valve 120 and a 1–2 shift valve 131. When the oil pressure is supplied to an oil passage 124 from the manual valve 120, the relay valve 150 is in its lower position shown in FIG. 3, so that the pump pressure (line pressure) is applied to the chamber 108. In this state, there is no oil pressure in the oil passage 134' from the 1–2 shift valve 131 so that when the chamber 109 is exhausted, the pressure regulator valve 105 produces a constant high oil pressure $P_{LH}$ (line pressure) solely with the oil pressure force applied to the differential area in the chamber 108. On the other hand, when there is oil pressure in the oil passage 134' from the 1–2 shift valve 131, the pressure regulator valve 105 produces an oil pressure $P_{LL}$ (line pressure) lower than $P_{LH}$ so as to balance the oil pressure forces applied to the differential areas in the chambers 108 and 109 against the spring force of the spring 106. Then, when the oil pressure in the oil passage 124 is exhausted, the relay valve 150 performs a pressure regulating action so that the pump pressure directed to the chamber 108 from the chamber at the lower end of the relay valve 150 is reduced by a value equivalent to the spring pressure of a spring 150'. Consequently, the oil pressure produced by the pressure regulator valve 105 is increased by a value equivalent to the pressure reduction by the valve 150 to produce an oil pressure $P_{HH}$ higher than $P_{LH}$.

The oil pressure regulated by the pressure regulator valve 105 is supplied to the manual valve 120. The manual valve 120 is linked to the shift lever installed in the drive's seat and it has six positions as shown in FIG. 3: P, R, N, D, 2 and L. Now with the manual valve 120 in the N position, the oil passage 121 is shut off and chambers 122 and 123 are released. Moving the manual valve 120 to the D position results in the conditions shown in FIG. 3 so that the oil passage 121 communicates with the oil passages 124, 125 and 126. The oil passage 124 is directly connected to a front clutch servo chamber 6a, the oil passage 125 is connected to a front brake band apply side servo chamber 22a through a 1–2 shift means 130, and the oil passage 126 is connected to a rear clutch servo chamber 7a and a front brake band release side servo chamber 22b through a 2–3 shift means 135. With the manual valve 120 in the 2 position, the oil passage 126 to the 2–3 shift means 135 is exhausted so that the oil passages 124 and 125 communicate with the oil passage 121. When the manual valve 120 is moved to the L position, the oil passages 125 and 126 are exhausted and the oil passages 124 and 127 communicate with oil passage 121. The oil passage 127 is connected by way of the 1–2 shift means 130 to a front band apply side servo chamber 22a through the oil passage 134 and to a rear brake band servo chamber 21a through an oil passage 127'. With the manual valve 120 in the R position, the oil passages 124, 125 and 126 are exhausted and the oil passages 127 and 128 communicate with the oil passage 121. The oil passage 128 is connected to the rear clutch servo chamber 7a through the 2–3 shift means 135.

The 1–2 shift means 130 comprises the 1–2 shift valve 131, a 1–2 solenoid 132 and a spring 131', and the 1–2 solenoid 132 comprises a plunger 133, a spring 133', a coil 132', etc. The oil pressure is supplied from the oil passage 121 through an orifice 121a into a chamber 121' defined between the right end of the 1–2 shift valve 131 and the solenoid 132. The 1–2 solenoid 132 is controlled with the signals from the electrical control section so that when the solenoid 132 is not energized, the plunger 133 is in its leftward position thereby closing an orifice $132_b$ by the spring 133' to shut off the chamber 121'. Consequently, the oil pressure in the chamber 121' moves the 1-2 shift valve 131 to the leftward position. When the 1-2 solenoid 132 is energized, the plunger 133 is moved to the rightward position by electromagnetic force so that the oil pressure in the chamber 121' is exhausted by an exhaust port $132_a$ through the orifice $132_b$ (Here, the diameter of the $121_a$ is so small as compared with the orifice $132_b$ that almost no residual pressure is developed in the chamber 121'). This moves the valve 131 to the rightward position by the force of the spring 131'.

The 2-3 shift means 135 comprises a 2-3 shift valve 136, a spring 136 and a 2-3 solenoid 137. The 2-3 solenoid 137 is identical with the 1-2 solenoid 132. A chamber 124' seen between the 2-3 shift valve 136 and the 2-3 solenoid 137 is supplied with oil pressure from the oil passage 124 through an orifice $124_a$. In this case, the diameter of the orifice 124a is made smaller than that of a solenoid orifice $137_b$ so that when the solenoid 137 is energized, the oil pressure in the chamber 124' is exhausted and thus the 2-3 shift valve 136 is moved to its rightward position by the spring 136'. On the other hand, when the solenoid 137 is not energized, the solenoid orifice $137_a$ is shut off by the solenoid plunger 138 so that the 2-3 shift valve 136 is moved to its leftward position by virtue of the oil pressure in the chamber 124'.

According to the positions of the manual valve 120, 1-2 shift valve 131 and 2-3 shift valve 136, the several hydraulic servos of the transmission are actuated to provide various gear positions. The following table indicates the summary of the positions of the manual valve 120 and the various operating conditions of the 1-2 solenoid 132, 2-3 solenoid 137 and the hydraulic servos for the different driving gear positions:

| Manual valve position | | 1-2 solenoid | 2-3 solenoid | Front clutch | Rear clutch | Front brake band | Rear brake band | One-way clutch |
|---|---|---|---|---|---|---|---|---|
| D | 1st speed | On | On | O | X | X | X | O |
|   | 2d speed | Off | On | O | X | O | X | X |
|   | 3d speed | Off | Off | O | O | X | X | X |
| 2 | 1st speed | On |  | O | X | X | X | O |
|   | 2d speed | Off |  | O | X | O | X | X |
| L | 1st speed | Off |  | O | X | X | O | (O) |
|   | 2d speed | On |  | O | X | O | X | X |
| R |  | Off | Off | X | O | X | O | X |

In the table, ON's indicate that the solenoids are energized and OFF's the solenoids are de-energized; /'s indicate that, in the 2 and L positions, the oil passage 126 is exhausted so that no oil pressure is supplied to the rear clutch and front brake band release sides irrespective of whether the 2-3 solenoid is on or off, and in the R position, the oil passage 124 is exhausted so that irrespective of whether the 2-3 solenoid is on or off, the 2-3 shift valve is moved to the rightward position joining the oil passage 128 with an oil passage 139. Regarding the hydraulic servo operations, O's indicate that the servos are in operation and X's indicate that the servos are out of operation and thus in the L position-1st speed the one-way clutch comes into operation when power is transmitted from the engine to the transmission output shaft, that is, for (the engine) driving. As will be apparent from the table, when both the 1-2 and 2-3 solenoids are not energized, i.e., when the two solenoids are in an off state, the L position-1st speed, 2 position-2nd speed or D position-3rd speed is obtained. Thus, even if no current is supplied to the solenoids due to the failure of the electrical control system, the automobile can be driven without any inconvenience.

On the other hand, when the manual valve 120 is in the L, 2 or D position and when the 1-2 solenoid 132 is in the off state, the 1-2 shift valve 131 is in its leftward position so that the oil pressure is supplied to the oil passage 134', that is, to chamber 109 of the pressure regulator valve 105 thereby producing the low pressure $P_{LL}$. On the contrary, when the 1-2 solenoid is in the on state, the chamber 109 is exhausted thereby regulating the line pressure to the high oil pressure $P_{LH}$.

As described above, depending on whether the 1-2 and 2-3 solenoids are energized, the proper gear position that suits the driving conditions is provided and the pressure regulating action of the pressure regulator valve 105 is also varied; and the necessary commands are provided from the electrical control section.

As shown in FIG. 4, the electrical control section comprises a throttle opening circuit 320, an output shaft rpm detecting unit 201, a neutral safety switch 610, a 1-2 shift point computing circuit 401, 2-3 shift point computing circuit 402 and a time selection circuit 501. It is to be noted here that signals referred to in the following discussion will mean DC voltages from the positive plate with the negative plate being grounded.

Figure 5A:
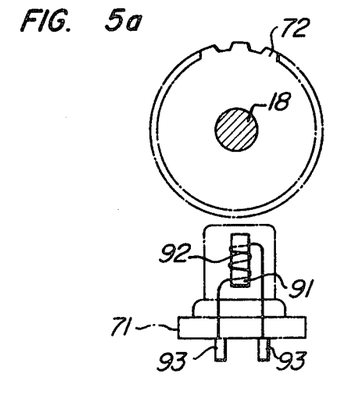
FIGS. 5a and 5b are schematic diagrams showing the structure of a rpm detector employed in the electrical control section.
Figure 5B:
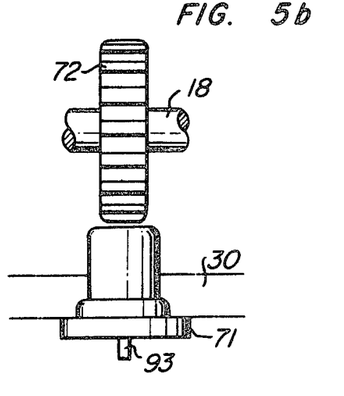

The output shaft rpm detecting unit 201 consists of an output shaft rpm detector 70 and a D-C converter 310. As shown in FIG. 1 and FIGS. 5a and 5b, the output shaft rpm detector 70 comprises an rpm indicator 71 mounted on housing 30 of the transmission and a toothed disk 72 integrally mounted on the transmission output shaft 18. As shown in FIG. 5a showing the side view of the disk 72, the disk 72 consists of a circular plate of magnetic material having a plurality of teeth formed on its periphery equally spaced and the rpm indicator 71 is mounted on the housing 30 at a position very close to the outer periphery of the toothed disk 72. The rpm indicator 72 consists of a permanent magnet 91 and a coil 92 wound on the former and they are housed in a suitable casing of non-magnetic material which is mounted on the transmission housing, so that one end of the permanent magnet 91 is located very close to the outer periphery of the toothed disk 72. As the toothed disk 72 rotates the toothed portions pass through the magnetic field of the permanent magnet 91, the leakage flux of the permanent magnet 91 is varied, thus producing an electromotive force in the coil 92. In this manner, an AC voltage signal having a frequency proportional to the rotational speed of the output shaft 18 is delivered from an output terminal 93 and the signal is applied to the D-A converter 310 by way of a line 311.

Figure 6:
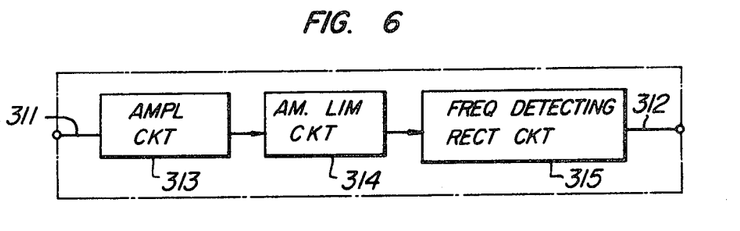
FIG. 6 is a block diagram showing the construction of a D-A conversion circuit employed in the electrical control section.

The D-A converter 310 is a circuit which converts the aforesaid digital AC voltage signal into a DC voltage which is an analog signal. This D-A converter is constructed as shown in FIG. 6. The AC voltage signal is introduced at the input of the converter by way of the line 311, its amplitude is amplified by an amplifier circuit 313, the resultant amplitude is then limited by an amplitude limiter circuit 314 and this AC voltage signal is further converted by a frequency detecting rectifier circuit 315 into a DC voltage which is in turn delivered over a line 312. This DC voltage is an analog voltage proportional to the rotational speed of the output shaft 18 or the vehicle speed. It is self-evident that in addition to the method just described above, there are many other methods of obtaining an analog voltage proportional to the vehicle speed, such as one in which a DC generator driven by the output shaft 18 is mounted to utilize its output shaft 18 is mounted to utilize its output voltage.

Figure 7:
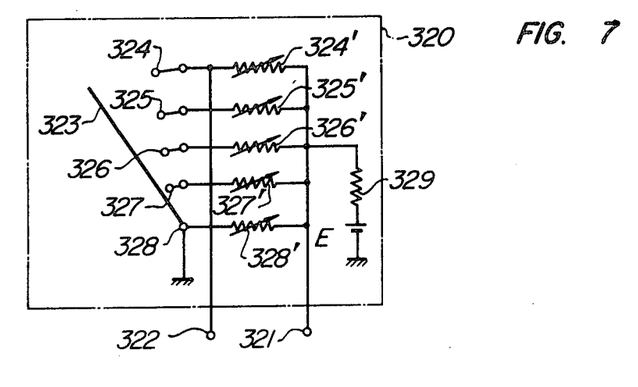
FIG. 7 is a circuit diagram showing the construction of a throttle opening circuit employed in the electrical control section.

Next, the construction of the throttle opening circuit 320 will be explained with reference to FIG. 7. The circuit 320 includes a multi-stage switch responding to the throttle opening which is a parameter of an engine torque. The multi-stage switch includes a movable contact 323 and fixed contacts 324, 325, 326 and 327 so that as the throttle opening changes from the fully closed throttle Se(1) to Se(2), Se(3), Se(4) and the wide open throttle Se(5), the movable contact 323 is successively disengaged with the fixed contacts 324, 325, 326 and 327, respectively. The movable contact 323 is connected to a variable resistor 328' and it is also connected to ground. The fixed contacts 324, 325, 326 and 327 are connected to variable resistors 324', 325'326' and 327', respectively. The other ends of the variable resistors 324' through 327' are connected to a common constant voltage source E by way of a resistor 329, and the junction points between the variable resistors 324' through 328' are connected to a throttle opening voltage output terminal 321. The fixed contact 324 is also connected to a set opening voltage output terminal 322.

With the arrangement described above, a resistance value $R_5$ is so chosen that at the wide open throttle Se(5) the output voltage produced at the throttle opening voltage output terminal 321 is given as $R_5/(R + R_5) E = E(5)$, where R is the resistance value of the variable resistor 329. Then, a resistance value $R_4$ of the variable resistor 327' is selected such that the output voltage produced at the output terminal 321 is $[(R_4 \| R_5)/(R_4 + R_5 + R)] E = E(4)$ when the throttle opening is Se(4), that is, when the movable contact 323 engages the fixed contact 327 only. $R_4 \| R_5$ is the resistance value when the variable resistors 327' and 328' are connected in parallel. Similarly, resistance values $R_3$, $R_2$ and $R_1$ of the variable resistors 326', 325' and 324' are selected such that the output voltages produced at the output terminal 321 are E(3), E(2) and E(1) when the throttle openings are Se(3), Se(2) and Se(1), respectively. Thus, a stepped voltage E(N) is produced according to the throttle opening Se(N) (N = 1, 2, 3, 4 and 5) and is taken out from the throttle opening voltage output terminal 321. While the number of the fixed contacts is four in the described embodiment, a larger number of such fixed contacts may be employed, if a more complicated stepped voltage is required. The set opening voltage output terminal 322 produces a voltage when the throttle opening is larger than Se(2), while it is held at the ground potential when the throttle opening is less than Se(2) thereby producing a signal representative of a small throttle opening, less than the set opening.

The neutral safety switch 610 comprises, as shown in FIG. 4, a movable contact 611 and a plurality of fixed contacts. This switch has six positions P, R, N, D, 2 and L corresponding to the positions of the manual valve 120 and in these positions the switch 610 controls the supply of the source voltage to the electrical control section. The switch 610 also functions as a range detecting switch. In other words, its fixed contact 612 is connected to the positive side of the power source by way of an ignition switch so that when the switch 610 is in the D, 2 or L position, the movable contact 611 brings the fixed contacts 612 and 613 into contact with each other thereby to deliver, at output 615, the power supply voltage as a signal (hereinafter referred to as a D position signal) which represents a forward drive position. When the switch 610 is in the L position, the fixed contact 614 is also brought into contact with the contacts 612 and 613 so that the power supply voltage is delivered at terminal 616 as an L position signal.

Figure 8:
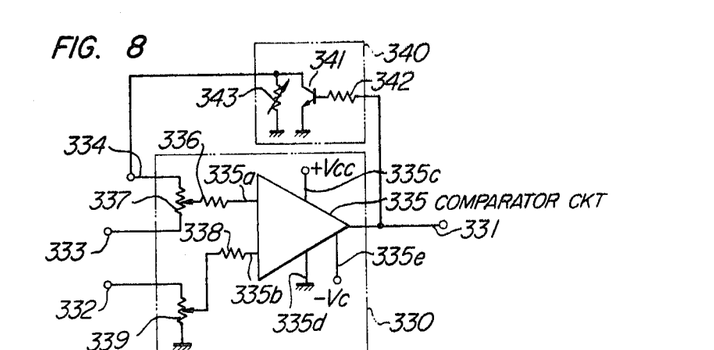
FIG. 8 is a circuit diagram showing the constructions of a discrimination circuit and a feedback circuit employed in the electrical control section.

Next, the 1-2 shift point computing circuit 401 will be explained. The circuit 401 comprises discrimination circuits 330 and 330', feedback circuits 340 and 340', a gate circuit 350 and an amplifier circuit 360. (In FIG. 4, although a logical circuit 390 is provided between the discrimination circuit 330 and the gate circuit 350, the logical circuit 390 will be explained later in connection with the time selection circuit 501 and here the discrimination circuit 330 is considered as directly connected to the gate circuit 350.) The discrimination circuit 330 and the feedback circuit 340 are constructed as shown in FIG. 8 in which numeral 335 designates a comparator circuit which may be easily constructed with commercially available integrated circuits (for example, NEC's $\mu$ pc 71 and TI Company's SN 72710N). Numeral 336 designates an input resistor whose one end is connected to an input terminal $335_a$ of the comparator circuit 335 and the other end is connected to the movable terminal of a variable resistor 337. The two fixed terminals of the variable resistor 337 are connected to input terminals 333 and 334 of the discrimination circuit 330, respectively. Numeral 338 designates an input resistor whose one end is connected to an input terminal $335_b$ of the comparator circuit 335 and the other end is connected to the movable terminal of a variable resistor 339. The fixed terminal of the variable resistor 339 has its one end connected to the input terminal 332 of the discrimination circuit 330 and the other end connected to ground. Numerals $335_c$, $335_d$ and $335_e$ designate respectively a positive power supply terminal, a grounding terminal and a negative power supply terminal of the comparator circuit 335. The feedback circuit 340 comprises an NPN transistor 341, a resistor 342 and a variable resistor 343. The emitter of the transistor 341 is connected to ground, its base is connected to an output terminal 331 of the discrimination circuit 330 (the output terminal of the comparator circuit 335) through a resistor 342, and the collector is connected to one end of the variable resistor 343 and to the input terminal 334 of the discrimination circuit 330. The other end of the variable resistor 343 is connected to ground. In operation, assuming that a "1" signal (the presence of a voltage) appears at the output terminal 331 when no signals are applied to the input terminals 332 and 333 of the discrimination circuit 330, the transistor 341 of the feedback circuit 340 is in the on state since a current is supplied to its base through the resistor 342, and thus the input terminal 334 of the discrimination circuit 330 is maintained at almost the ground potential. Now, when a throttle opening signal voltage E(N) is applied to the input terminal 332 and an analog voltage En (hereinafter referred to as an output shaft rpm signal En) proportional to the previously mentioned output shaft revolutions is applied to the input terminal 333, a voltage E'n developed at the movable terminal of the variable resistor 337 is given by $E'n = [R_b/(R_a + R_b)]$ En and a voltage E'(N) developed at the movable terminal of the variable resistor 339 is given by $E'(N) = [R_d/(R_c + R_d)]$ E(N), where $R_a$ is the resistance value between the input terminal 333 and the movable terminal of the variable resistor 337, $R_b$ is the resistance value between this movable terminal and the collector of the transistor 341, $R_c$ is the resistance value between the movable terminal of the variable resistor 339 and the input terminal 332, and $R_d$ is the resistance value between the last-mentioned movable terminal and the ground. In other words, the comparator circuit 335 receives the voltage E'n at its input terminal $335_a$ through the input resistor 336 and the voltage E'(N) at another input terminal $335_b$ through the input terminal 338. The comparator circuit 335 compares the voltages E'n and E'(N) so that if the result of E'n − E'(N) is positive, than a "0" signal (the absence of signal voltage) appears at the output terminal 331, while a one signal appears if the result is negative. When E'n − E'(N) > 0 so that the signal at the output terminal 331 of the discrimination circuit 330 changes to zero, the transistor 341 of the feedback circuit 340 is turned off since no base current is supplied thereto. At this time the input terminal 334 of the discrimination circuit 330 is connected to ground through the variable resistor 343. Thus, if $R_e$ represents the resistance value of the variable resistor 343, then the potential at the input terminal $335_a$ of the comparator circuit 335 is given as $E''n = ](R_b + R_e)/(R_a + R_b + R_e)]$ En and hence $E''n > E'n$ for the same En. Thus, the signal at the output terminal 331 of the comparator circuit 335 changes from zero to one at a lower output shaft rpm signal En (at lower vehicle speed) than when it changes from one to zero. In other words, depending on whether the signal at the output terminal 331 of the comparator circuit 335 is zero or one, the feedback circuit 340 varies the amount of correction (dividing ratio) of the output shaft rpm signal En by the resistors to change the discrimination conditions of the discrimination circuit 330. In this manner, the signals at the output terminal 331 may be stabilized, thereby preventing the occurrence of any phenomenon which would cause the hunting of signals between one and zero.

Figure 9:
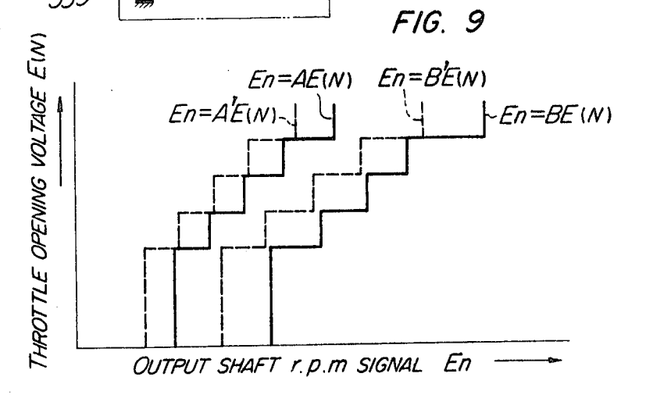
FIG. 9 is a graph showing, with the shift lever (manual valve) in the D or 2 position, the relationship between the output shaft rpm signal and the throttle opening signal for explaining the shift ranges of the present invention.

It will be now apparent from the foregoing that by properly adjusting the variable resistors 337, 339 and 343 of the discrimination circuit 330 and the feedback circuit 340, the relation En = A E(N) between the output shaft rpm signal En and the throttle opening signal E(N) when the signal at the output terminal 331 changes from one to zero and another relation En = A' E(N) between the two signals when the signal at the output terminal 331 changes from zero to one are established, respectively. This is shown in FIG. 9. In this figure, as the value of the signal En increases and goes into the region on the right side of the curve En = A E(N), the signal at the output terminal 331 changes from one to zero. On the contrary, as the value of En decreases and goes into the region on the left side of the curve En = A' E(N), the signal at the output terminal 331 changes from zero to one.

Next, the discrimination circuit 330', feedback circuit 340' and gate circuit 350 will be explained. The discrimination circuit 330' and the feedback circuit 340' are identical in construction with the previously described discrimination circuit 330 and the feedback circuit 340, respectively, excepting that the relations between the throttle opening signal E(N) and the output shaft rpm signal En which determine the signal at the output terminal 331' of the discrimination circuit 330' are reversed, since the discrimination circuit 330 receives the signal E(N) at its input terminal 332 and the signal En at another input terminal 333, whereas the discrimination circuit 330' receives the signal En at its input terminal 332' and the signal E(N) at another terminal 333'. The gate circuit 350 selects either one of the output signals from the discrimination circuits 330 and 330'. In other words, the gate circuit 350 passes the output signal of the discrimination circuit 330' to the amplifier circuit 360 when it receives the L position signal from the neutral safety switch 610, otherwise it passes the output signal of the discrimination circuit 330 to the amplifier circuit 360. The reason for this is the fact that in the hydraulic control section the operations of the 1-2 solenoid 132 for providing the first and second speeds when the manual valve 120 is in the L position must be reversed from those which are required to provide the same speeds when the manual valve 120 is in the 2 and D positions. Therefore, in view of the objects of the present invention, there will be no inconvenience even if the discrimination circuit 330', feedback circuit 340' and gate circuit 350 are eliminated and it is considered that the output terminal 331 of the discrimination circuit 330 is directly connected to the input terminal of the amplifier circuit 360. Thus, these circuits will not be explained in detail.

The amplifier circuit 360 may be composed of any conventional amplifier and it functions to operate the 1-2 solenoid 132. Therefore, the amplifier circuit 360 may be eliminated, if the solenoid 132 is operated by the output signal from the gate circuit 350.

Next, the 2-3 shift point computing circuit 402 will be explained. The 2-3 shift point computing circuit 402 comprises a discrimination circuit 330'', a feedback circuit 340'' and an amplifier circuit 366, and their functions are similar with those of the corresponding circuits 330, 340 and 360 of the 1-2 shift point computing circuit 401. The discrimination circuit 330'' computes the relationship En = B E(N) between the output shaft rpm signal En and the throttle opening signal E(N) when the voltage at its output terminal 331'' changes from one to zero and another relation En = En(N) between the two signals when the voltage at the output terminal 331'' changes from zero to one. Thus, if the output shaft rpm signal En (FIG. 9) rises and eventually satisfies the condition En ≧ B E(N), there appears no signal voltage at the output terminal 331'' ('1' → '0'). On the contrary, if the signal En becomes sufficiently low to satisfy the condition En ≦ B'E(N), a voltage appears at the output terminal 331'' and the voltage is then amplified by the amplifier 366 to a value sufficient to energize the 2-3 solenoid 137.

Next, the principal feature of the present invention, i.e., the shock relieving operation during the shift from the neutral position to a driving position will be explained. This shock relieving operation is performed by the time selection circuit 501 in response to the output signals from the neutral safety switch 610 and the throttle opening circuit 320. In other words, when the shift to a forward drive position is made from the neutral position at a small throttle opening less than a preset opening, the operation of the 1-2 solenoid 132 is delayed for a predetermined time so that the transmission which should otherwise be placed in the first speed is placed in the second speed for the predetermined time to relieve the shock in the gear engagement.

Figure 10:
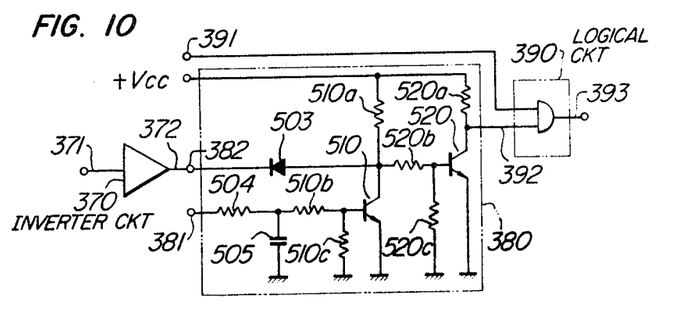
FIG. 10 is a circuit diagram of a time selection circuit.

The time selection circuit 501 comprises an inverter circuit 370, a delay time circuit 380 and a logical circuit 390 and these circuits are constructed as shown in FIG. 10. The inverter circuit 370 may be composed of any conventional inverter circuit. The emitter of a transistor 510 in the delay time circuit 380 is connected to ground and its base is connected to ground through a resistor $510_c$ and is also connected through a resistor $510_b$ to a resistor 504 and a capacitor 505 which are designed to introduce the required time delay. The resistor 504 is connecting through an input terminal 381 to a terminal 615 of the neutral safety switch 610 and the capacitor 505 is connected to ground. The collector of the transistor 510 is connected to a power source $+V_{cc}$ through a resistor $510_a$, to an output terminal 372 of the inverter circuit 370 through a diode 503 and further to the base of a transistor 520 through a resistor $520_b$. The base of the transistor 520 is in turn connected to ground through a resistor $520_c$, its emitter is connected to ground and the collector is connected to the power source $+V_{cc}$ by way of the resistor $520_a$ and further to an input terminal 392 of the logical circuit 390. The logical circuit 390 comprises an AND circuit and it is connected between the discrimination circuit 330 and the amplifier circuit 360. In other words, an input terminal 391 of the logical circuit 390 is connected to the output terminal 331 of the discrimination circuit 330 and its output terminal 393 is connected to the input terminal of the amplifier circuit 360.

In operation, the input terminal 371 of the inverter circuit 370 receives a zero signal from the set opening voltage output terminal 322 of the throttle opening circuit 320 when the throttle opening is less than a predetermined opening, while it receives a "1" signal when the throttle opening is larger than the predetermined opening. Thus, the inverted signals are delivered at the output terminal 372, that is, a "1" signal is produced when the throttle opening is less than the predetermined opening and a "0" signal is produced when the throttle opening is larger than the predetermined opening. The signal produced at the output terminal 372 is then applied to an input terminal 372 of the delay time circuit 380. The diode 503 of the delay time circuit 380 forms an AND circuit with the transistor 510, so that when a "0" signal is applied to the input terminal 382, that is, when the throttle opening is larger than the predetermined opening, the "0" signal is applied to the base of the transistor 520 thereby maintaining the transistor 520 in the off stage irrespective of the input signal applied to the input terminal 381. Thus, a "1" signal is applied to the input terminal 392 of the logical circuit 390 so that the output signal of the discrimination circuit 330 which is applied to the other input terminal 391 is taken out as it stands from the output terminal 393 and it is then applied to the amplifier circuit 360. On the other hand, when a "1" signal is applied to the input terminal 382 of the delay time circuit 380, that is, when the throttle opening is less than the predetermined opening and a D position signal from the neutral safety switch 610 is simultaneously applied to the other input terminal 381, the transistor 510 is turned on at the expiration of a time T which is the time constant as determined by the resistor 504 and the capacitor 505. In other words, the transistor 510 is held in the off state during the delay time T and the transistor 520 is thus maintained in the on state so that a "0" signal is applied to the input terminal 392 of the logical circuit 390 which in turn provides a "0" output signal irrespective of the output signal from the discrimination circuit 330. After the expiration of the delay time T, the transistor 510 is turned on and the transistor 520 is thus turned off so that a "1" signal is applied to the input terminal 392 of the logical circuit 390 and the output signal of the discrimination circuit 330 is directly taken out from the output terminal 393 of the logic circuit 390. In other words, in response to the D position signal introduced at the input of the time selection circuit 501 when the throttle opening is less than a predetermined opening, the time selection circuit 501 produces a "0" signal during the delay time T only, irrespective of the output signal of the discrimination circuit 330 in the 1-2 shift point computing circuit 401. In this way, if a shift is made (by the operation of the shift lever for the transmission) from the neutral position into a forward drive position (D, 2) at a small throttle opening less than the predetermined throttle opening and at a low vehicle speed or at rest, instead of energizing the 1-2 solenoid 132 to place the transmission in the first speed as would be the case in other circumstances, the 1-2 solenoid 132 is held in the off state during the delay time T so that the 1-2 shift valve 131 is held in the second speed position and the oil pressure is supplied to the oil passage 134' extending from the 1-2 shift valve 131 to the chamber 109 of the pressure regulator valve 105, thereby regulating the line pressure to $P_{LL}$ pressure and simultaneously supplying the oil pressure to the front brake band apply side 22a to cause the front brake band servo to act as an accumulator. Thus, the front clutch 6 for transmitting the drive to the transmission is engaged gently. It is now evident that this considerably reduces the shock that would occur during the described shifting operation.

Figure 11:
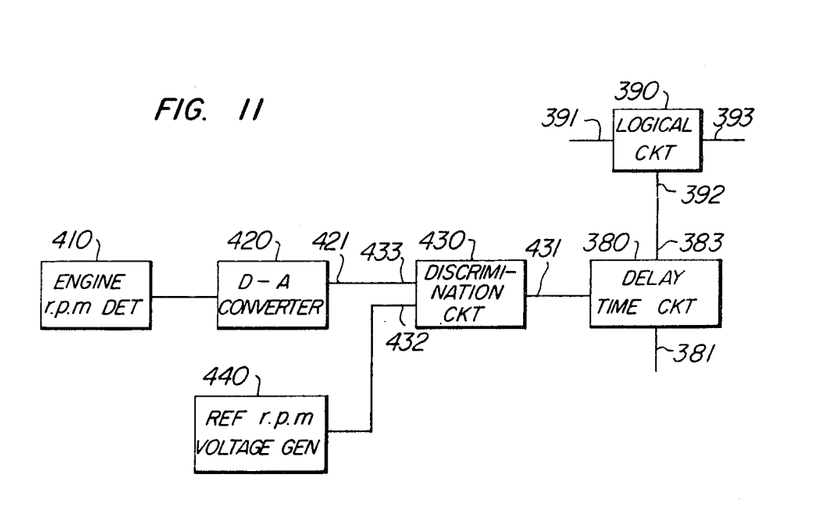
FIG. 11 is a block diagram of the time selection circuit when the engine rpm signal is applied to the input thereof as an engine torque responsive signal.

While in the embodiment described above the time selection circuit 501 is designed to perform its time delaying operation only when the throttle opening is less than the predetermined opening, this provision is made in consideration of the fact that at a large throttle opening the engine torque tends to increase with a resultant increase in the load on the transmission and thus if the above-described control is effected to engage the second speed, some inconvenience such as the burning of the friction elements in the servo system for the transmission clutches, brakes and so on may be caused. Therefore, if there is no need to take the occurrence of such inconvenience into consideration (e.g., if the friction elements are highly resistive to wear), the time selection circuit 501 need not be controlled depending on the throttle openings. Thus, it may be constructed to perform a time delaying function whenever a shift is made to a forward drive position from the neutral position. While in the described embodiment the time selection circuit 501 is employed which requires a small throttle opening for its operation, it may be replaced with a circuitry operative on a signal which is a parameter of any other driving conditions of a vehicle. For example, such a substitutional circuitry may consist of a circuit shown in FIG. 11 which requires a low engine speed for its operation. In FIG. 11, the delay time circuit 380 and logical circuit 390 are the same circuits as used in the time selection circuit 501 and so are their connections. An engine rpm detector 410 and a D-A converter 420 are of the similar types as the output shaft rpm detector 70 and the D-A converter 310, respectively, and an analog voltage proportional to the engine revolutions is provided from an output terminal 421. A reference rpm voltage generator 440 produces a voltage signal having a value equal to that of an output voltage produced by the D-A converter 420 when the engine revolutions reach a predetermined reference speed. A discrimination circuit 430 is of the similar type as the discrimination circuit 330 in the 1-2 shift point computing circuit 401 and it compares the output voltage of the D-A converter 420 and the output voltage (reference voltage) of the reference rpm voltage generator 440 so that a zero signal is produced when the output voltage of the D-A converter 420 is higher than the reference voltage and "1" signal is produced when the output voltage of the D-A converter 420 is lower than the reference voltage. These signals are delivered at an output terminal 431. Thus, the delay time circuit 380 receives at its input terminal 382 a "0" signal when the engine speed is higher than the predetermined reference speed and a "1" signal when the engine speed is lower than the predetermined reference speed, so that a time delaying operation is permitted only when the engine speed is lower than the reference speed. In this connection, the previously mentioned delay time T may suffice if it is long enough to ensure the completion of a shift from the neutral position to a forward drive position and the engagement of the front clutch 6 under the normal conditions (when no delay is introduced). Therefore, the required delay time may generally be in the order of one second or less.

While the preferred embodiments of the present invention have been described as applied to an automatic transmission having three forward speeds and one reverse speed, it is apparent, to those who understand fully the technical concept of the invention, that many other embodiments are also possible. This is self-evident from the substantial technical concept of the invention.

We claim:

1. In an automatic transmission including a speed change gear and friction engagement unit with hydraulic servo means for accomplishing gear shifting engagements of the speed change gear and friction engagement unit, a shift control system comprising:

shift valve means for changing fluid channels to selectively direct and exhaust the hydraulic pressure to said hydraulic servo means, shift point computing circuits for generating shift signals to control the fluid channel changing operations of said shift valve means, and means for delaying for a predetermined time interval the effective actual time of application of at least one of said shift signals produced by said shift point computing circuits to produce a smoother resultant gear shifting operation.

2. A shift control system according to claim 1, wherein there is further provided:

a hydraulic pressure source for supplying hydraulic pressures to said hydraulic servo means, a shift range setting valve having at least a neutral position and a forward drive position for controlling fluid circuits between said hydraulic pressure source and said hydraulic servo means, vehicle engine torque responsive signal generating means, vehicle road speed responsive signal generating means, and a shift switch for detecting the forward drive position of said shift range setting valve said shift switch being connected to actuate said means for effecting predetermined time control.

3. A shift control system according to claim 2, wherein there is further provided:

a pressure regulating valve for regulating the hydraulic pressure from said hydraulic pressure source to a predetermined pressure level when said hydraulic pressure is to be applied to said hydraulic servo means, a control fluid chamber in said pressure regulating valve for controlling the hydraulic pressure to be regulated to a relatively low pressure level in the presence of a controlling hydraulic pressure, and channel means for establishing a fluid connection between a channel to said hydraulic servo means used for accomplishing a high speed drive ratio in response to a preselected state of said shift valve means and said control fluid chamber in said pressure regulating valve, whereby when said shift range setting valve is moved from said neutral position to said forward drive position, said shift valve means is placed for a predetermined time in position for providing said high speed drive ratio by the action of said means for effecting predetermined time control, thereby controlling the hydraulic pressure produced by said pressure regulator valve.

4. In a vehicle automatic transmission shift control system including a speed changing gear and friction engaging unit having hydraulically controlled servo units and a source of hydraulic fluid at a normal regulated valve for effecting selective gear ratio changes in response to electrical shift point signals generated from a shift point computing circuit which is, in turn, responsive to at least one vehicle operating parameter and the position of a manual shift means having at least positions corresponding to a neutral and a forward drive condition, an improvement comprising:

first means for detecting when said manual shift means is changed from the neutral to the forward drive condition, and second means connected to said source of hydraulic pressure fluid and to said first means, said second means being actuated by said first means for providing a lower pressure than said normal regulated hydraulic line pressure from said source for a predetermined time period immediately after actuation thereby relieving the degree of shock encountered when changing the transmission from a neutral to a driving status and thereafter providing said normal regulated hydraulic line pressure.

5. An improvement as in claim 4 wherein said second means comprises a time delay means connected between said shift point computing circuit and said speed changing gear and friction engaging unit whereby, when actuated by said first means, at least one shift point signal is effectively blocked for a predetermined time period.

6. An improvement as in claim 4 wherein:

the speed changing gear and friction engaging unit is normally biased to a relatively high speed ratio status and where a change from neutral to a forward drive condition in said manual shift means results in activation of an electromagnetically operated valve to change the status to a first low forward driving speed ratio, fluid control means are provided for reducing the normal regulated pressure valve of said source of hydraulic fluid when said relatively high speed ratio status exists, and said second means effectively delays the eventual change to said first low forward driving speed ratio status for an initial predetermined time period.

7. In a vehicle transmission providing at least low and high forward torque transmitting outputs, and having manually operable means for operating said transmission, a shift control system comprising:

means for providing a first electrical signal which varies as a function of throttle position, means for providing a second electrical signal when said manually operable means is in a position associated with forward torque, control circuit means for providing an electrical output signal causing said transmission to be shifted between states providing said low and high forward torque outputs as a function of engine operating conditions, and logic means for receiving said first and second signals and causing said control circuit means to shift to a state other than the state providing said high torque output for a predetermined time before shifting to said high torque output when said second signal indicates said manually operable means has just been shifted to a position associated with forward torque and said first signal indicates the throttle setting is below a predetermined value so as to relieve the transmission shock resulting from shifting to a forward position at a low throttle position.

8. A system as in claim 7 wherein said transmission is automatic and includes low, intermediate and high torque transmitting outputs, wherein said control circuit means includes a first shift point computer for providing an electrical signal causing shifting between states providing said high and intermediate torque outputs and a second shift point computer for providing an electrical signal causing shifting between states providing said intermediate and low torque outputs and wherein said logic means includes means for delaying for a predetermined time interval operation of said second computer when said second signal indicates said manually operable means has just been shifted to a position associated with forward torque and said first signal indicates the throttle setting is below a predetermined value so that said transmission is shifted to a state providing said intermediate torque during said predetermined time interval and to said state providing said high torque following said predetermined time interval.

9. A system as in claim 8 wherein said transmission includes a hydraulic system for effecting shifting including a first solenoid which is actuated by said first computer and a second solenoid which is actuated by said second computer and wherein said delaying means include means connected between said second computer and said second solenoid for temporarily preventing said second computer for operating said second solenoid.

* * * * *